United States Patent
Lee et al.

(10) Patent No.: US 10,704,124 B2
(45) Date of Patent: Jul. 7, 2020

(54) ALLOY FOR VEHICLE GARNISH AND VEHICLE GARNISH

(71) Applicants: Hyundai Motor Company, Seoul (KR); Kia Motors Corporation, Seoul (KR); Industry-Academia Cooperation Group of Sejong University, Seoul (KR)

(72) Inventors: Hoo-Dam Lee, Anyang-si (KR); Hoon-Mo Park, Seongnam-si (KR); Hyun-Min Kang, Seongnam-si (KR); Tae-Gyu Lee, Seoul (KR); Jong-Kook Lee, Suwon-si (KR); Ki Buem Kim, Seoul (KR); Yeon Beom Jeong, Seoul (KR)

(73) Assignees: Hyundai Motor Company, Seoul (KR); Kia Motors Corporation, Seoul (KR); Industry-Academia Cooperation Group of Sejong Univ, Seoul (KR)

( * ) Notice: Subject to any disclaimer, the term of this patent is extended or adjusted under 35 U.S.C. 154(b) by 202 days.

(21) Appl. No.: 15/856,680

(22) Filed: Dec. 28, 2017

(65) Prior Publication Data
US 2018/0347012 A1   Dec. 6, 2018

(30) Foreign Application Priority Data
May 30, 2017 (KR) .................. 10-2017-0066849

(51) Int. Cl.
*C22C 9/10* (2006.01)
*B60R 13/02* (2006.01)

(52) U.S. Cl.
CPC ............... *C22C 9/10* (2013.01); *B60R 13/02* (2013.01)

(58) Field of Classification Search
CPC .................................. B60R 13/02; C22C 9/10
USPC ......................................................... 420/490
See application file for complete search history.

(56) References Cited

U.S. PATENT DOCUMENTS

| | | | |
|---|---|---|---|
| 6,607,982 B1 * | 8/2003 | Powell | H01L 21/2855 257/E21.169 |
| 2014/0096877 A1 * | 4/2014 | Maki | C22F 1/08 148/684 |
| 2014/0283962 A1 * | 9/2014 | Ito | C22C 9/00 148/684 |

FOREIGN PATENT DOCUMENTS

| | | |
|---|---|---|
| FR | 1.091.463 A | 1/1954 |
| JP | 2003-248712 A | 9/2003 |
| KR | 10-1285700 B1 | 7/2013 |
| KR | 10-2014-0012034 A | 1/2014 |

* cited by examiner

*Primary Examiner* — Jie Yang
(74) *Attorney, Agent, or Firm* — Morgan, Lewis & Bockius LLP

(57) ABSTRACT

Disclosed herein is an alloy for a vehicle garnish, which is made by mixing Cu as a base with Mg and Si to have a composition of $Cu_aMg_bSi_c$, wherein the alloy can have a color close to Au and the color of the alloy can be changed, and wherein the allow can also be made to have a low specific gravity and at a low cost.

6 Claims, 6 Drawing Sheets

■ Cu        ■ $Cu_{80}Mg_{10}Si_{10}$        ■ $Cu_{70}Mg_{15}Si_{15}$

ALLOY FOR VEHICLE GARNISH AND VEHICLE GARNISH

CROSS-REFERENCE(S) TO RELATED APPLICATIONS

The present application claims priority to Korean Patent Application No. 10-2017-0066849, filed on May 30, 2017, the entire contents of which is incorporated herein for all purposes by this reference.

BACKGROUND OF THE INVENTION

Field of the Invention

The present invention relates to an alloy for a vehicle garnish, for making a decorative garnish built in a vehicle, and a vehicle garnish made of the same.

Description of Related Art

In general, a garnish is one of decorative built-in components that are mounted to trims or instrument panels in a vehicle, and the garnish creates aesthetics alone by a process of adhering a film to plastic or a painting process.

In recent years, the material of a vehicle garnish (interior finishing material) has been changed from an existing plastic material to a metal material as customer sensitivity is increasingly important. Especially, a real metal (aluminum) material has been mainly used as the material of the garnish in luxury vehicles.

However, the garnish has a limited color because aluminum simply has only a silver-white metal color. Hence, the garnish makes an attempt to be colored through anodizing in order to exhibit a variety of colors.

However, the garnish has a limited effect in that a unique texture of metal is lowered even though a color different from aluminum may be exhibited by the anodizing.

To overcome this limitation in recent years, studies on the use of Cu—Zn series brass to apply it to the garnish are ongoing. Copper (Cu) has a density of 8.96 g/cm$_3$, zinc (Zn) has a density of 7.13 g/cm$^3$, and Cu—Zn series brass has a relatively high specific gravity.

In addition, such brass shows a color close to gold, but its color is considerably different when viewed from a chromatic diagram.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a copper alloy, the color of which can be close to Au and can be changed/modified, the copper alloy having a low specific gravity and being cheap, and a vehicle garnish made of the same.

Other various aspects of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with various exemplary embodiments of the present invention, an alloy for a vehicle garnish is made by mixing copper (Cu) as a base with magnesium (Mg) and silicon (Si) to have a composition of $Cu_aMg_bSi_c$.

The $Mg_b$ and the $Si_c$ may be added such that the sum of the subscript b and the subscript c is from 10 to 20 (e.g., 10, 11, 12, 13, 14, 15, 16, 17, 18, 19, or 20).

The alloy may have a specific gravity of about 6.7 g/cm$^3$ to about 7.8 g/cm$^3$ (about 6.7 g/cm$^3$, about 6.8 g/cm$^3$, about 6.9 g/cm$^3$, about 7.0 g/cm$^3$, about 7.1 g/cm$^3$, about 7.2 g/cm$^3$, about 7.3 g/cm$^3$, about 7.4 g/cm$^3$, about 7.5 g/cm$^3$, about 7.6 g/cm$^3$, about 7.7 g/cm$^3$).

The alloy may have a hardness of about 120 Hv to about 300 Hv (e.g., about 120 Hv to about 300 Hv, about 120 Hv to about 250 Hv, about 120 Hv to about 200 Hv, about 120 Hv to about 250 Hv, about 120 Hv to about 200 Hv, about 150 Hv to about 300 Hv, about 175 Hv to about 300 Hv, about 200 Hv to about 300 Hv, about 150 Hv to about 300 Hv, about 250 Hv to about 300 Hv, about 150 Hv to about 250 Hv).

In a L*a*b* color coordinate, "L" may have a value of 80 or more (e.g, 80, 81, 82, 83, 84, 85, 87, 89, 90, 93, 95, 96, 98, or more).

In the L*a*b* color coordinate, "a" may have a value of 3 to 9 (e.g., 3, 4,5, 6, 7, 8, or 9).

In the L*a*b* color coordinate, "b" may have a value of 12 to 19 (e.g., 12, 13, 14, 15, 16, 17, 18, or 19).

In accordance with various exemplary embodiments of the present invention, a vehicle garnish is made by mixing Cu as a base with Mg and Si to have a composition of $Cu_aMg_bSi_c$, wherein in a L*a*b* color coordinate, "L" has a value of 80 or more (e.g, 80, 81, 82, 83, 84, 85, 87, 89, 90, 93, 95, 96, 98, or more).

In the L*a*b* color coordinate, "a" may have a value of 3 to 9 (e.g., 3, 4, 5, 6, 7, 8, or 9).

In the L*a*b* color coordinate, "b" may have a value of 12 to 19 (e.g., 12, 13, 14, 15, 16, 17, 18, or 19).

The $Mg_b$ and the $Si_c$ may be added such that the sum of the subscript b and the subscript c is from 10 to 20 (e.g., 10, 11, 12, 13, 14, 15, 16, 17, 18, 19, or 20).

In accordance with various exemplary embodiments of the present invention, a vehicle garnish is made of the alloy for a vehicle garnish.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
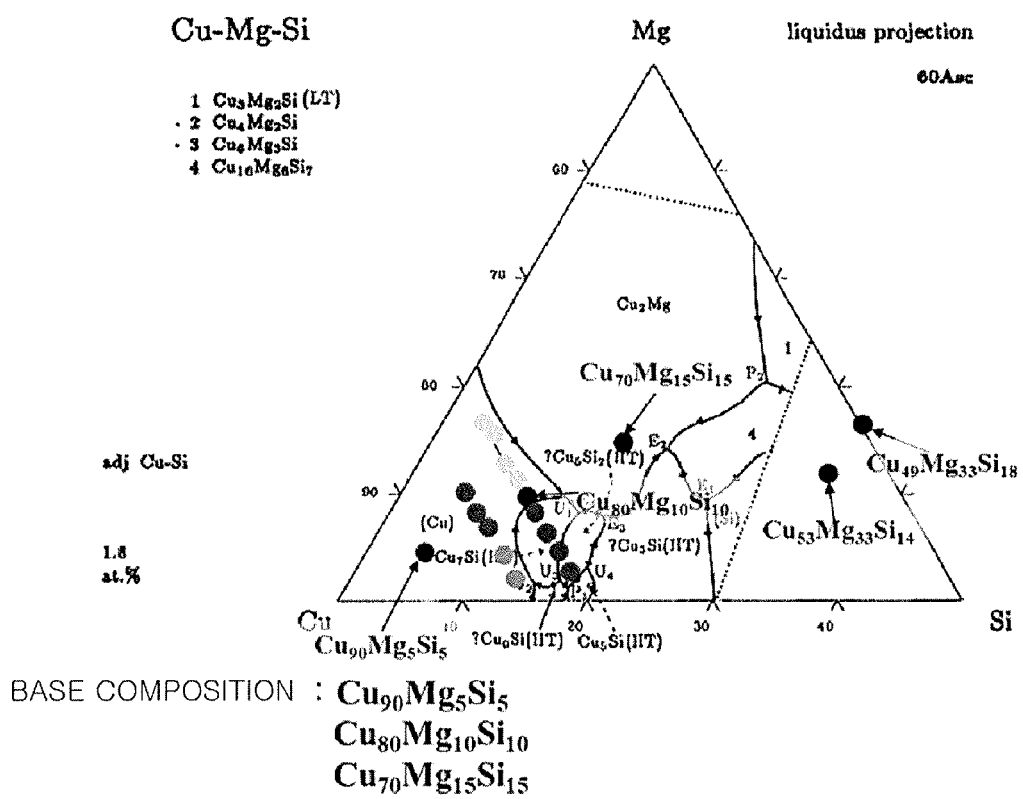
FIG. 1 is a phase diagram of a copper alloy containing magnesium (Mg) and silicon (Si).

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the exemplary embodiments of the present invention, detailed descriptions of functions and constructions well known in the art may be shortened or omitted to avoid unnecessarily obscuring appreciation of the disclosure by a person of ordinary skill in the art.

Various aspects of the present invention are directed to providing an alloy for a vehicle garnish and a vehicle garnish, and, particularly, to an alloy, the color of which may be close to Au and be flexibly controlled, compared to an existing alloy for a garnish, the alloy having a relatively low specific gravity.

Alloys including Cu—Zn series brass that have been researched in recent years have a limited color and a relatively high specific gravity, compared to the alloy according to the exemplary embodiment of the present invention.

The following Table 1 shows components and specific gravities of the alloys that have been researched in recent years.

TABLE 1

| Name | Chemical component | | | | | | | | Specific gravity $(g/cm^3)$ | Hardness (Hv) |
|---|---|---|---|---|---|---|---|---|---|---|
| | Cu | Zn | Pb | Fe | Sn | Mn | Al | Si | | |
| Brass | 59-71.5 | rest | 0.07 or less | 0.05 or less | | | | | 8.1-8.2 | 125 or less |
| High-strength brass | 56-59 | rest | 0.5 or less | 0.1-1.5 | | 0.5-3 | 0.2-2 | | 8.1-8.2 | 125 or less |
| Phosphor copper | 80-90 | rest | 0.5 or less | 0.1-1.5 | | 0.5-3 | 0.2-2 | | 8.1-8.2 | 125 or less |

As shown in Table 1, the Cu—Zn (copper-zinc) series brass has a relatively high specific gravity of 8.1 to 8.2 $g/cm^3$, and a hardness of 125 Hv or less.

Although will be described later, the above alloys do not have a color close to or similar to gold (Au) and it is also difficult to exhibit various colors.

The alloy for a vehicle garnish according to the exemplary embodiment of the present invention is to be developed to overcome these limitations. The alloy is a Cu—Mg—Si alloy made by mixing Cu with Si and Mg, and has a composition of $Cu_aMg_bSi_c$.

As will be shown in the result of experiment later, the atomic weights (at %), a, b, and c have a limited range of values, and the sum of a, b, and c is 100 (a+b+c=100).

The composition of the Cu—Mg—Si alloy according to the embodiment of the present is shown in the following Table 2.

TABLE 2

| $M1_a$ | $M2_b$ | $M3_c$ | a | b | c | Note | Hardness (Hv) |
|---|---|---|---|---|---|---|---|
| Cu | Mg | Si | 90 | 5 | 5 | | 120 |
| Cu | Mg | Si | 85 | 10 − x | 5 + x | x = 0-5 | 180-250 |
| Cu | Mg | Si | 85 | 10 + x | 5 − x | x = 0-3 | 180-250 |
| Cu | Mg | Si | 80 | 10 − x | 10 + x | x = 0-7 | 250-300 |
| Cu | Mg | Si | 80 | 10 + x | 10 − x | x = 0-7 | 250-300 |

If the content of Mg+Si is less than or equal to 10% in the limited composition of Table 2, the Cu—Mg—Si alloy has a specific gravity of 7.8 or more that is similar to the specific gravity (8.1 to 8.2 $g/cm^3$) of an existing Cu—Zn alloy, and the color of the Cu—Mg—Si alloy is slightly changed similar to a Cu alloy.

If the content of Mg+Si is equal to or more than 20%, the Cu—Mg—Si alloy has a specific gravity of 6.7 or less, but has strong brittleness whereby it is impossible to process the alloy.

For this reason, the alloy intended to be developed has the following limited composition, and the color and hardness evaluation thereof is carried out based on the phase diagram of FIG. 1.

That is, the alloy has a limited range of 80≤a≤90 and a limited range of 10≤b+c≤20, in which case the alloy has a specific gravity of 6.7 to 7.8 $g/cm^3$. In various exemplary embodiments, a is 80, 90, or any number ranging from 80 to 90 (e.g., about 80, 81, 82, 83, 84, 85, 86, 87, 88, 89, or 90). Also, b+c can be 20 or less than 20 (e.g., 20, 19, 18, 17, 16, 15, 14, 13, 12, 11, or 10). In an embodiment, a is 90, b is 5 and c is 5.

Figure 2:
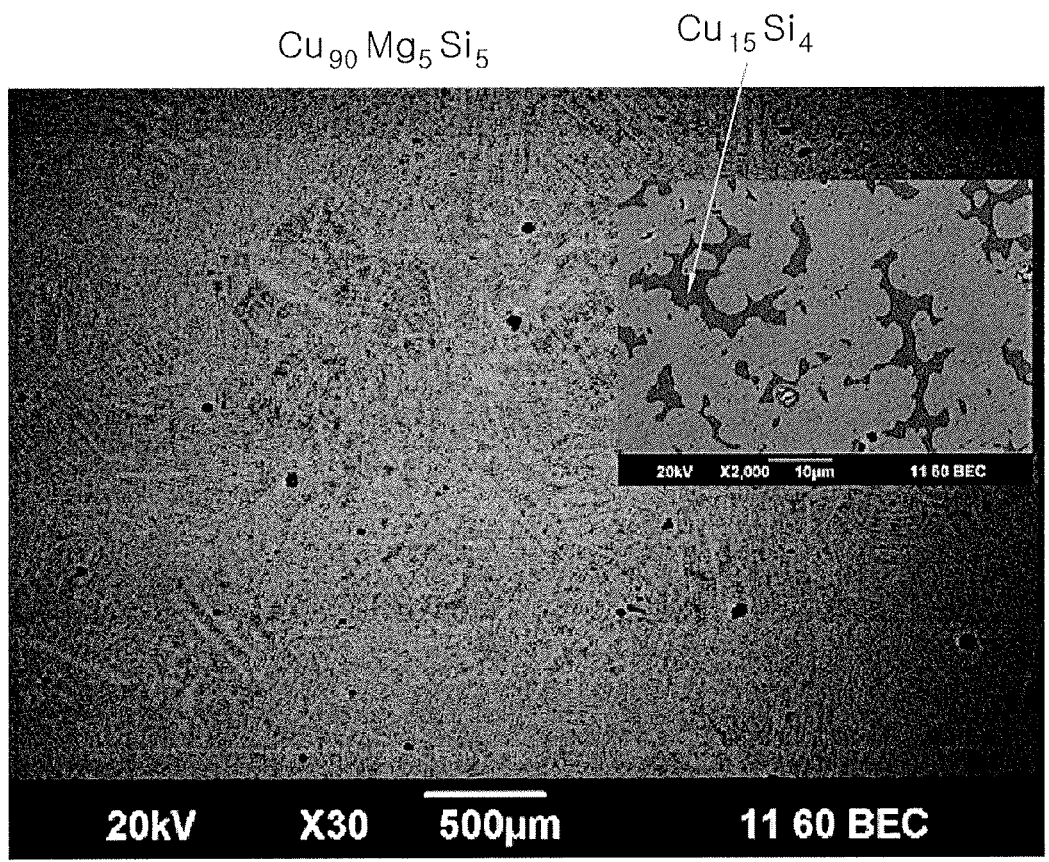
FIG. 2, FIG. 3 and FIG. 4 are photographs illustrating a microstructure according to the combination of Mg and Si.
Figure 3:
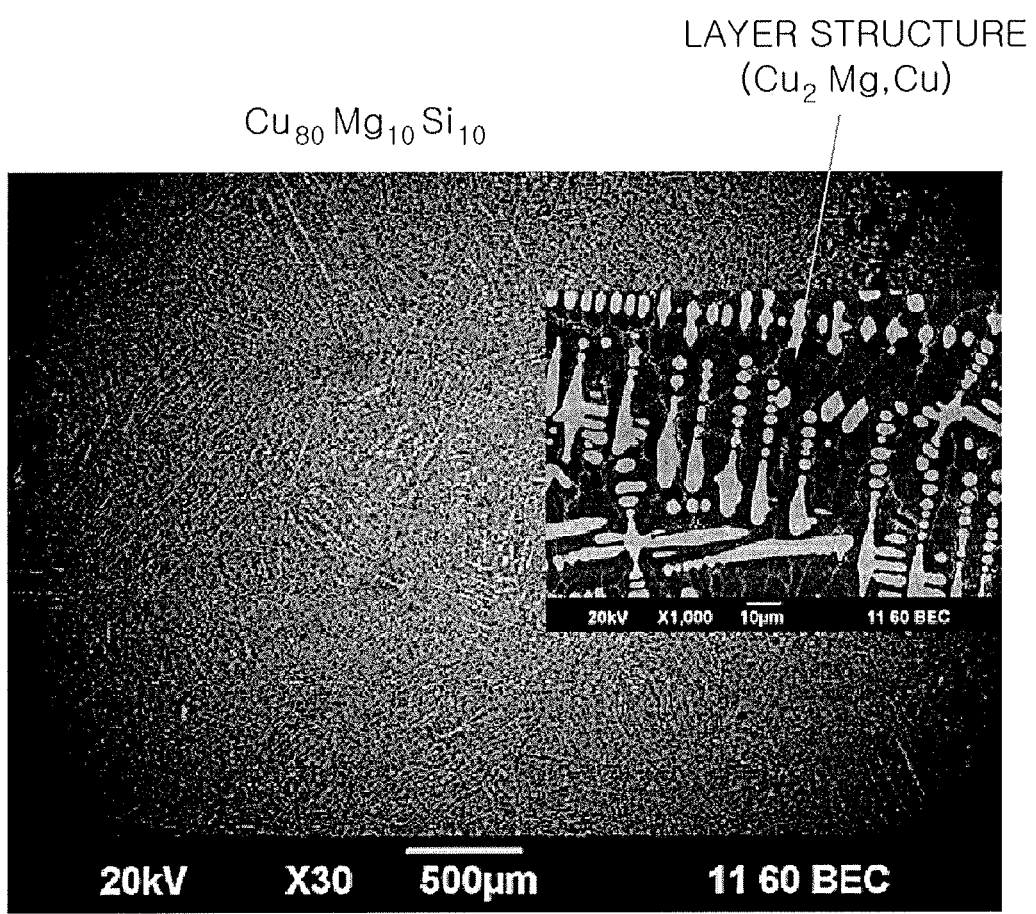
Figure 4:
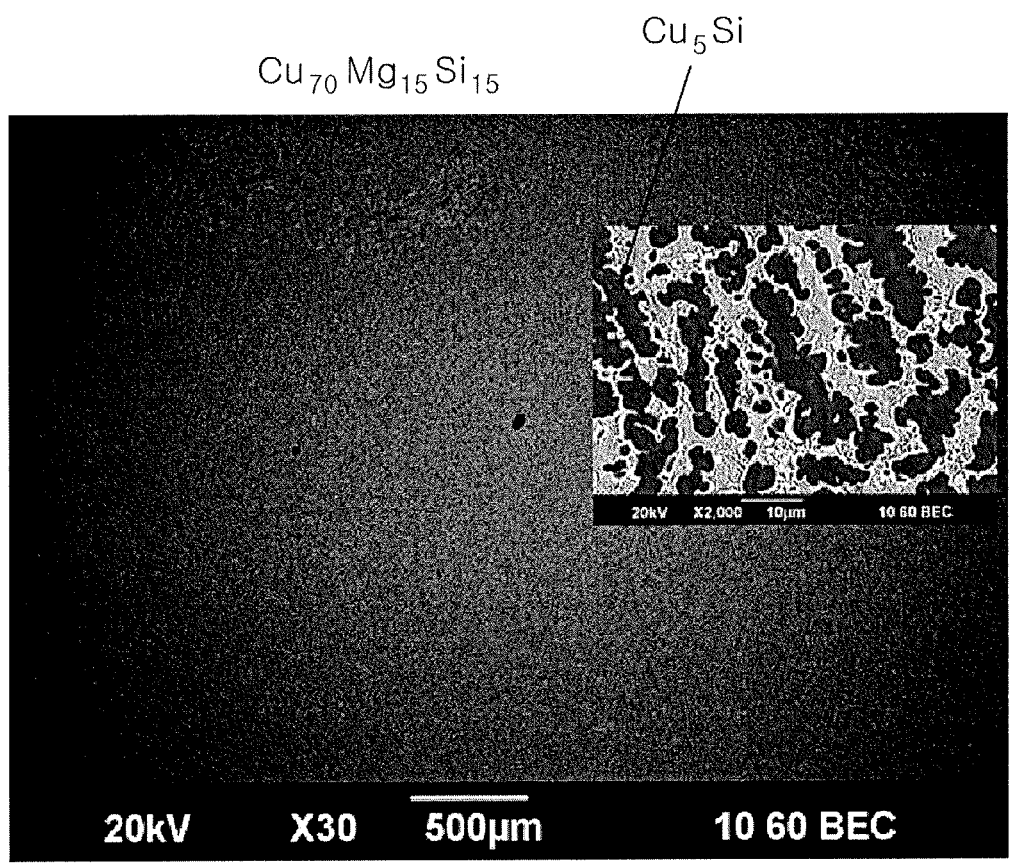

FIG. 2, FIG. 3 and FIG. 4 are photographs illustrating a microstructure according to the combination of Mg and Si.

As in the phase diagram of FIG. 1, the hardness of the alloy is increased hardness while $Cu_{15}Si_4$ is formed in $Cu_{90}Mg_5Si_5$ and $Cu_2Mg$ is formed in $Cu_{80}Mg_{10}Si_{10}$, according to the addition of Mg and Si to Cu, and thus the alloy has a hardness of about 120 Hv to about 300 Hv (e.g., about 120 Hv to about 300 Hv, about 180 Hv to about 300 Hv, about 180 Hv to about 250 Hv, about 120 Hv to about 300 Hv, about 180 Hv to about 250 Hv, or about 250 Hv to about 300 Hv) as shown in Table 2.

It can be seen that it is difficult to use the alloy having a composition of $Cu_{70}Mg_{10}Si_{10}$ or more since its brittleness is rapidly caused due to formation of $Cu_5Si$ therein.

Figure 5:
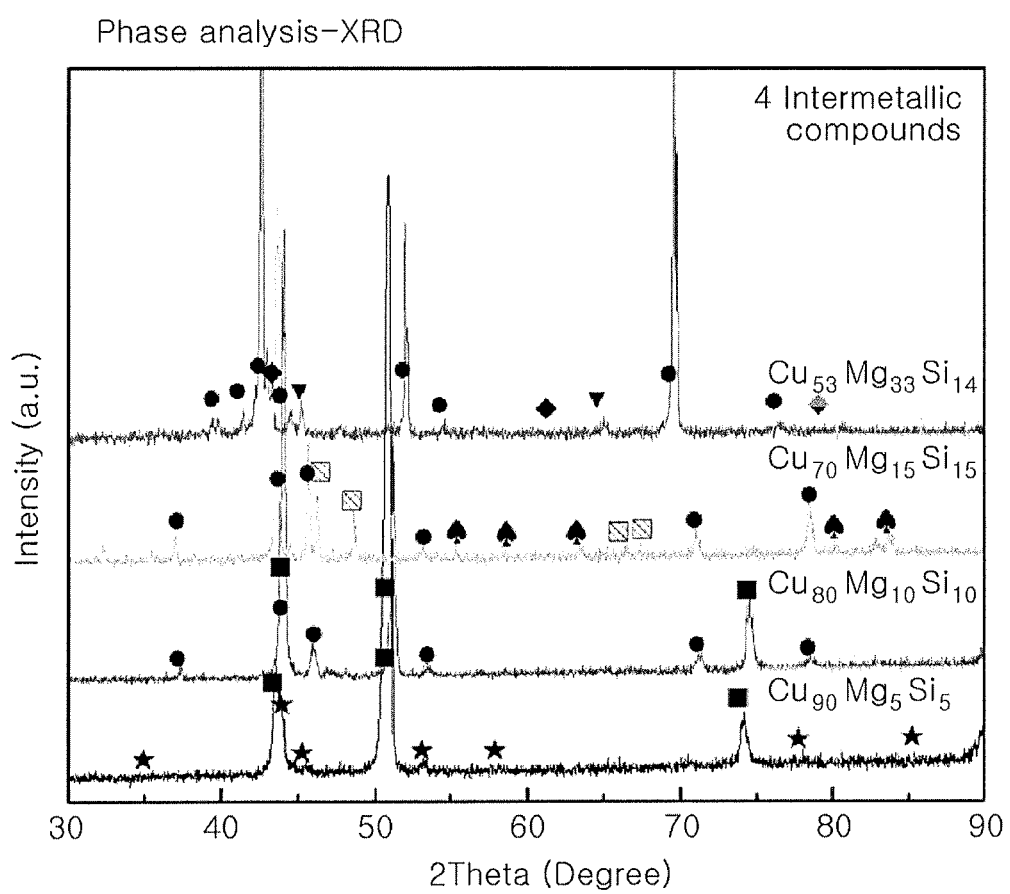
FIG. 5 is a graph illustrating an XRD analysis result of an alloy according to an exemplary embodiment of the present invention.

FIG. 5 is a graph illustrating an XRD analysis result of the alloy according to the exemplary embodiment of the present invention, where the symbol ★ refers to $Cu_{15}Si_4$ (epsilon), the symbol ■ refers to Copper, the symbol • refers to $Cu_2Mg$, the symbol ♣ refers to $Cu_5Si$, the symbol ♦ refers to Mg, the symbol □ refers to $Cu_{16}Mg_6Si_7$, and the symbol ▼ refers to $Cu_{41}Mg_2Si_{0.96}$.

$Cu_{15}Si_4$ and $Cu_2Mg$ phases are formed according to the increase of Mg and Si contents, and the brittleness of the alloy is increased due to formation of $Cu_5Si$ in the case of b=15 and c=15.

Figure 6:
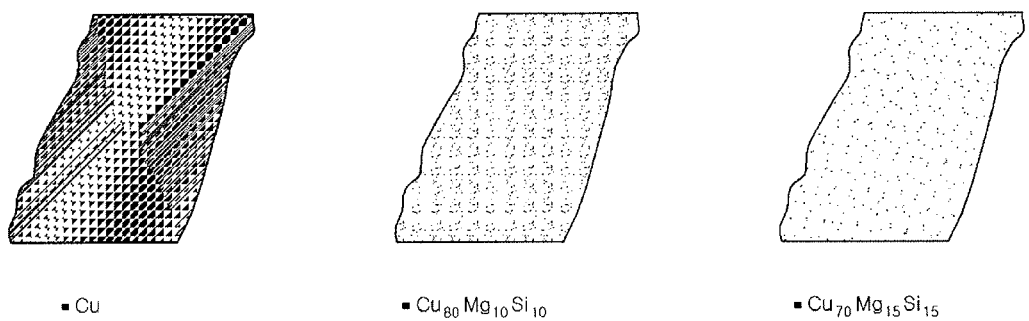
FIG. 6 is a comparative view of a color of the alloy according to the exemplary embodiment of the present invention with colors of Cu and comparative examples.

FIG. 6 is a comparative view of a color of the alloy according to the exemplary embodiment of the present invention with colors of Cu and comparative examples.

As a result, it can be seen that the color of the made alloy is changed from copper to brass depending on the addition of Mg and Si to Cu. In addition, it can be seen that the brittleness of the alloy is rapidly caused when the sum of Mg and Si exceeds 20, and the color of the alloy is changed to silver-white instead of gold while cracks occur due to the hot shocks of test pieces.

Figure 7:
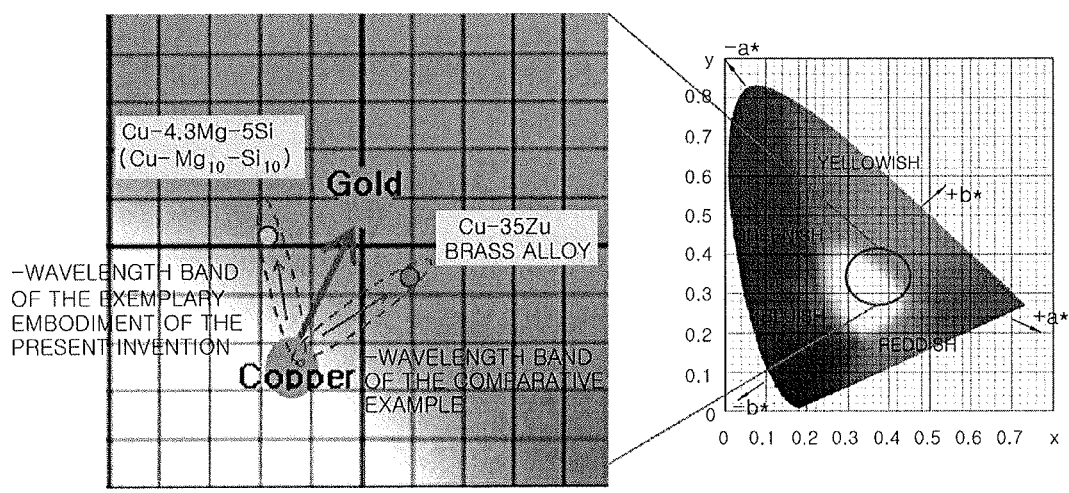
FIG. 7 is a graph illustrating colors of the alloy according to the exemplary embodiment of the present invention and the comparative examples with reference to a color coordinate.

The color result of the alloy having the composition according to the exemplary embodiment of the present invention is shown in the following Table 3, and FIG. 7 illustrates colors of the alloy according to the exemplary embodiment of the present invention and the comparative examples with reference to a color coordinate.

CIE 1976 L*a*b* is a condition of color measurement, wherein a reference color space is set as a reference wavelength for changing the measured wavelength to a color space, and a reference observer angle is set as 10 degrees since wavelength values of light differ depending on the angle viewing a color.

A light source is set as D65 since reflected and observed colors differ depending on the values of incident wavelength, apertures have the same size of 6 mm to reduce an error for the influence of surface roughness during metal measurement, and uniform surface roughness is formed using #2000 sandpaper since L, a, and b values are changed depending on the surface roughness.

In the color coordinate, the symbol L* refers to brightness, black is when L*=0, and white is when L*=100. The symbol a* refers that the color is biased to which of red and green, the color is biased to green when a* is a negative number, and the color is biased to red/violet when a* is a positive number. In addition, the symbol b* refers to yellow and blue, blue is when b* is a negative number, and yellow is when b* is a positive number.

TABLE 3

| | Color Scale | | |
|---|---|---|---|
| Name | L* | a* | b* |
| Pure Cu | 82.0974 | 16.9046 | 23.2895 |
| Gold (Au) | 83.5605 | 10.427 | 44.3897 |
| $Cu_{90}Mg_1Si_1$ | 82.6974 | 14.2046 | 21.2895 |
| $Cu_{90}Mg_5Si_5$ | 83.007 | 8.9206 | 18.6197 |
| $Cu_{80}Mg_{10}Si_{10}$ | 86.7016 | 3.1754 | 12.8178 |
| $Cu_{70}Mg_{15}Si_{15}$ | 80.4907 | 0.2958 | 3.9279 |

TABLE 3-continued

| | Color Scale | | |
|---|---|---|---|
| Name | L* | a* | b* |
| Phosphor copper | 75.654 | 13.1708 | 0.8953 |
| Brass | 81.1854 | 0.8953 | 36.5281 |

As in the result of experiment, it can be seen that $Cu_{90}Mg_5Si_5$ and $Cu_{80}Mg_{10}Si_{10}$ corresponding to the present invention have a color that is closest to gold (Au), compared to other comparative examples.

In addition, as illustrated in FIG. 7, the color of the alloy is changed to silver-white as the symbols a and b are close to "0", and the brass shows bright gold as the value of b is close to Au but the value of a is close to "0".

However, the alloy according to the exemplary embodiment of the present invention shows gold having slight green compared to Cu since the symbol a is closer to Au.

As described above, the color of the alloy can be changed from copper to gold by controlling the content of Mg and Si. Therefore, the alloy for a vehicle garnish can be made to have a unique color suitable for the concept intended to be implemented in the vehicle, and thus exhibit independent sensitivity for vehicles.

In accordance with exemplary embodiments of the present invention, an alloy for a vehicle garnish can have a color closer to Au, compared to other copper alloys.

In addition, the alloy for a vehicle garnish can be inventive since its color is flexibly adjusted according to the content of Mg and Si.

Furthermore, the alloy for a vehicle garnish can contribute to better merchantable quality of a garnish and a vehicle since it has a relatively low specific gravity and is cheap.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An alloy for a vehicle garnish, comprising a composition with chemical formula $Cu_aMg_bSi_c$, wherein a,b,c denote an atomic weight percentage (at%) and are numbers greater than zero, wherein the Mg and the Si are added such that the subscript b of $Mg_b$ is from 5 to 10 and the subscript c of $Si_c$ is from 5 to 10.

2. The alloy of claim 1, wherein the alloy has a specific gravity of about 6.7 g/cm$^3$ to about 7.8 g/cm$^3$.

3. The alloy of claim 1, wherein the alloy has a hardness of about 120 Hv to about 300 Hv.

4. The alloy of claim 1, wherein in a L*a*b* color coordinate, "L*" has a value of 80 or more.

5. The alloy of claim 4, wherein in the L*a*b* color coordinate, "a*" has a value of 3 to 9.

6. The alloy of claim 5, wherein in the L*a*b* color coordinate, "b*" has a value of 12 to 19.

* * * * *